(12) United States Patent
Sato et al.

(10) Patent No.: US 10,072,704 B2
(45) Date of Patent: Sep. 11, 2018

(54) COMPOSITE SLIDING BEARING AND WIND POWER GENERATING DEVICE USING THE SAME BEARING

(71) Applicant: FUJI ELECTRIC CO., LTD., Kawasaki-shi (JP)

(72) Inventors: Shoji Sato, Kawasaki (JP); Masahiro Hoshi, Tokyo (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 938 days.

(21) Appl. No.: 14/477,141

(22) Filed: Sep. 4, 2014

(65) Prior Publication Data

US 2015/0017000 A1 Jan. 15, 2015

Related U.S. Application Data

(63) Continuation of application No. PCT/JP2013/066677, filed on Jun. 18, 2013.

(30) Foreign Application Priority Data

Jun. 19, 2012 (JP) ................................. 2012-138017

(51) Int. Cl.

| F16C 33/10 | (2006.01) |
| F03D 80/70 | (2016.01) |
| F16C 27/02 | (2006.01) |
| F16C 41/00 | (2006.01) |
| F16C 17/10 | (2006.01) |
| F16C 27/06 | (2006.01) |
| F16C 33/06 | (2006.01) |
| F16C 33/20 | (2006.01) |

(52) U.S. Cl.
CPC .......... *F16C 33/1055* (2013.01); *F03D 80/70* (2016.05); *F16C 17/10* (2013.01);
(Continued)

(58) Field of Classification Search
CPC ........ F16C 17/10; F16C 17/105; F16C 23/02; F16C 23/04; F16C 27/02; F16C 27/063;
(Continued)

(56) References Cited

U.S. PATENT DOCUMENTS 4,243,274 A * 1/1981 Greene .................... F16C 17/10
384/111
9,458,880 B2 * 10/2016 Kari ........................ F16C 17/10
(Continued)

FOREIGN PATENT DOCUMENTS

| EP | 2568168 A1 | 3/2013 |
| FR | 2415747 A1 | 8/1979 |

(Continued)

OTHER PUBLICATIONS

Extended European Search Report dated Feb. 11, 2016.

*Primary Examiner* — James Pilkington
(74) *Attorney, Agent, or Firm* — Rabin & Berdo, P.C.

(57) ABSTRACT

A composite sliding bearing is disclosed. The composite sliding bearing has an inner ring, formed of split rings halved by a center in an axial direction, which has V-section inclined surfaces formed on the outer diameter surfaces of the split rings, bearing pads disposed separately on the inclined surfaces of the split rings along the outer diameter surface of the inner ring, and an outer ring on the inner diameter surface of which is formed a V-section umbrella-shaped inclined surface corresponding to the outer diameter surface of the inner ring. A radial load and axial load applied to the bearing are supported by sliding the inner diameter surface of the outer ring on the sliding surfaces of the bearing pads in a condition in which the bearing pads are fluid lubricated.

7 Claims, 4 Drawing Sheets

(52) U.S. Cl.
CPC ............ *F16C 27/02* (2013.01); *F16C 33/103* (2013.01); *F16C 41/004* (2013.01); *F05B 2240/50* (2013.01); *F05B 2260/98* (2013.01); *F16C 27/063* (2013.01); *F16C 33/06* (2013.01); *F16C 33/20* (2013.01); *F16C 2208/32* (2013.01); *F16C 2208/36* (2013.01); *F16C 2300/14* (2013.01); *F16C 2360/31* (2013.01); *Y02E 10/722* (2013.01)

(58) Field of Classification Search
CPC .... F16C 33/06; F16C 33/103; F16C 33/1045; F16C 33/1055; F16C 2300/14; F16C 2360/31; F03D 80/70; F05B 2240/50; F05B 2260/98
See application file for complete search history.

(56) References Cited

U.S. PATENT DOCUMENTS

2006/0220389 A1* 10/2006 Shibata ................. F16C 19/386
                                                                290/55
2009/0015020 A1*  1/2009 Stiesdal .................... F03D 9/25
                                                                290/55
2010/0177999 A1*  7/2010 Waki ....................... F16C 17/03
                                                                384/312
2012/0099993 A1   4/2012 Guerenbourg et al.
2012/0237152 A1   9/2012 Wheals
2013/0071246 A1   3/2013 Kari et al.

FOREIGN PATENT DOCUMENTS

| JP | S58-42420 U | 3/1983 |
| JP | H04-008915 A | 1/1992 |
| JP | H08-177711 A | 7/1996 |
| JP | 2005-105917 A | 4/2005 |
| JP | 2006-118552 A | 5/2006 |
| JP | 2009-019625 A | 1/2009 |
| JP | 2010-116959 A | 5/2010 |
| JP | 2011-064141 A | 3/2011 |
| JP | 2011-140983 A | 7/2011 |
| WO | WO-2011/003482 A2 | 1/2011 |
| WO | WO-2011/033256 A1 | 3/2011 |
| WO | WO 2011-127510 A1 | 10/2011 |

* cited by examiner

FIG. 4
RELATED ART

COMPOSITE SLIDING BEARING AND WIND POWER GENERATING DEVICE USING THE SAME BEARING This application is a continuation of international application number PCT/JP2013/066677, filed Jun. 18, 2013, and claims the benefit of priority of Japanese patent application JP PA 2012-138017, filed Jun. 19, 2012. The disclosures of the international application and the Japanese priority applications are incorporated herein by reference.

TECHNICAL FIELD

The present invention relates to a composite sliding bearing which is applied to a main shaft's bearing of a wind power generating device or the like, thus supporting a radial load and axial load, and to a configuration of a wind power generating device employing the sliding bearing.

BACKGROUND ART

As is well known, the drive type of a wind power generation device is classified roughly into an overdrive type (for example, refer to PTL 1 and PTL 2) and a direct drive type (for example, refer to PTL 3).

That is, the number of rotation of the horizontal axis wind turbine employed in many current wind power generating devices is a superlow speed of on the order of tens of revolutions per minute, and in the overdrive type, a speed increasing system (a gear box) is connected between a wind turbine and a generator, thus increasing the number of rotation of the generator. However, there is the problem in a gear type speed increasing system that the noise is large, and there also arise a lot of problems, thus taking a lot of trouble over maintenance.

As opposed to this, a direct drive type generator using no speed increasing system is of a structure wherein the generator has a large diameter in order to increase the circumferential speed of the generator.

Meanwhile, as an axial load which varies according to wind direction and speed, apart from a radial load, is applied to a bearing of a main shaft which supports the wind turbine of the wind power generating device and a rotor of the generator, a double row tapered roller bearing has heretofore been employed as the main shaft's bearing (for example, refer to PTL 4).

CITATION LIST

Patent Literature

PTL 1: JP-A-8-177711 (FIG. 3)
PTL 2: JP-A-2011-64141
PTL 3: JP-A-2009-19625 (FIG. 3)
PTL 4: JP-A-2005-105917

SUMMARY OF INVENTION

Technical Problem

As a recent trend, there is a tendency for a wind power generating device to increase in capacity, and a wind power generating device of over a 5 MW class has now started to be fabricated, but when attempting to drive a generator of this class using the direct drive type, the generator (synchronous generator) is required to have a diameter size of over 10 m. Also, as a result of the increase in capacity of the generator, the main shaft linking the wind turbine and generator also increase in diameter as a matter of course.

Meanwhile, in general, a rolling bearing, such as a double row tapered roller bearing, is employed as the main shaft's bearing of the wind power generation device, as previously described, but special steel is used for the rolling bearing, and it requires forging and heat treatment processes to manufacture the bearing, meaning that high manufacturing technology and large manufacturing facilities are required for fabrication of a large-bore rolling bearing, and in the existing state, the bore of even an ultralarge bearing is considered to have an upper limit of on the order of 4 m.

For the heretofore described reasons, as an existing problem, it is assumed that when the direct drive type generator increases in diameter size as the wind power generating device increases in capacity, it is difficult to employ a rolling bearing as the main shaft's bearing of the large-capacity wind power generating device.

Therefore, it is under study that a sliding bearing which is inexpensive, is of a simple structure, can be increased in bore, and furthermore, is also superior in heavy load and impact load resistant capacity, compared with the rolling bearing, is employed as the main shaft's bearing of the wind power generating device.

Meanwhile, in general, a heretofore known sliding bearing is manufactured as a bearing wherein a journal bearing and thrust bearing are of separate types. Consequently, in order to construct the main shaft's bearing of the wind power generating device using the sliding bearing, it is conceivable to configure the main shaft's bearing by separating the bearing into a sliding bearing for radial load and a sliding bearing for axial load and then mounting those two sliding bearings in one bearing stand or bearing bracket. Herein, FIG. 4 shows, with a bearing applied to the main shaft of the wind power generating device as an example, a design structure example of a composite sliding bearing wherein a sliding bearing acting as a heretofore known journal bearing (for radial load) and a sliding bearing acting as a heretofore known thrust bearing (for axial load) are mounted in the same bearing bracket.

Figure 4:
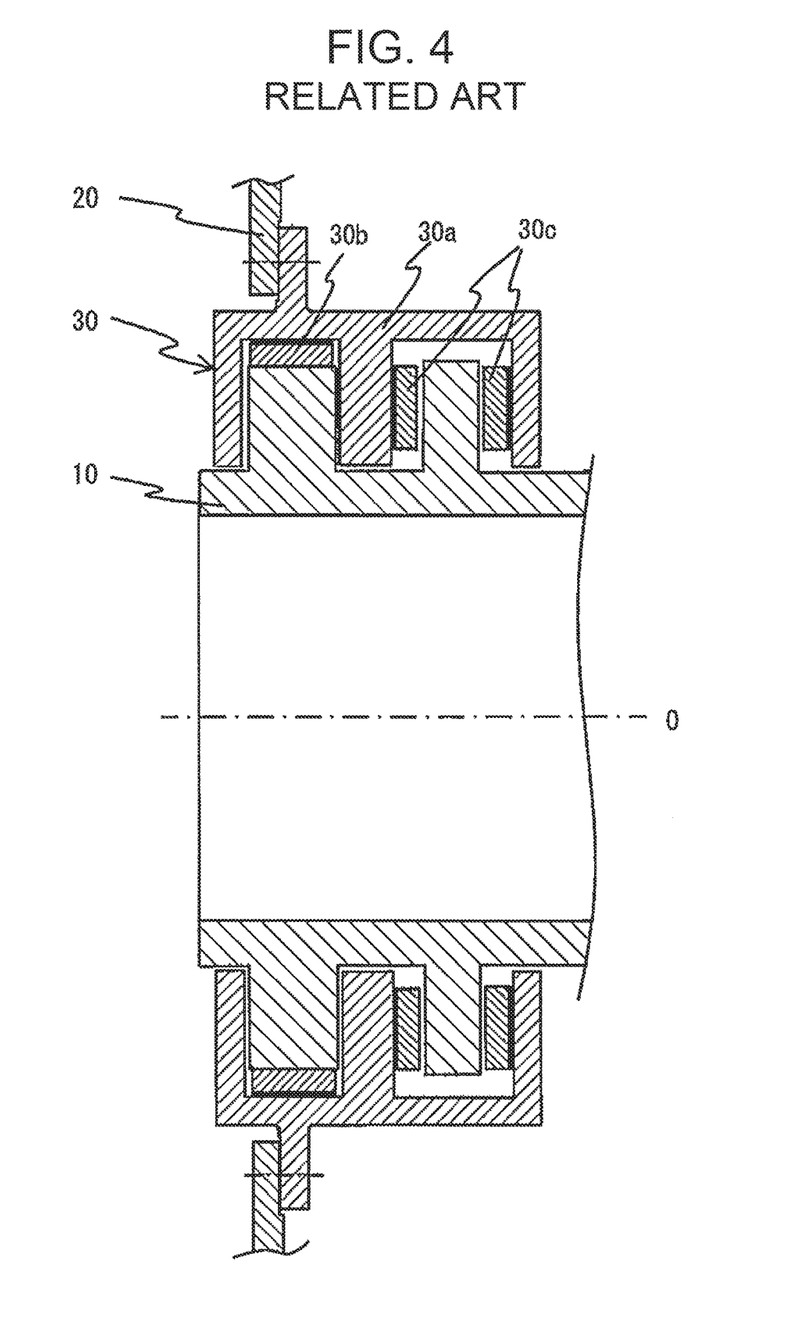
FIG. 4 is a schematic view of a related-art device.

In FIG. 4, 10 is a fixed shaft (hollow type horizontal shaft) attached to, for example, a nacelle of a wind power generating device, 20 is a rotor center (a support frame) of a generator, and 30 is a main shaft's composite sliding bearing installed between the fixed shaft 10 and the rotor center 20 of the generator, wherein the composite sliding bearing 30 is of a structure constructed on the cylindrical hollow fixed shaft 10 with a bearing pad 30b for radial load, and two separate rows of bearing pads 30c for axial load disposed in an axial direction, combined inside a rotation side bearing bracket 30a of a halved structure. 0 in FIG. 4 is the axial center of the fixed shaft 10.

However, as the composite sliding bearing 30 shown in FIG. 4 is of a three-row structure wherein the bearing pad 30b for radial load and the bearing pads 30c (two rows) for axial load are aligned in the axial direction, the axial length of the bearing increases, and the number of parts also increase, meaning that it is difficult to miniaturize and compactify the bearing.

Apart from this, with the main shaft's bearing of a wind power generating device having a wind turbine and generator installed in a top portion of a tower, there is also the problem that, when replacing the bearing pads 30b and 30c of the main shaft's bearing, it is difficult to perform maintenance work to disassemble and reassemble the bearing 30 in a high place of the tower.

The invention, having been contrived bearing in mind the heretofore described points, has for its object to provide a composite sliding bearing which is of a simple, small, and compact configuration and can stably support a radial load and axial load, and moreover, which is also easy to assemble and disassemble and is superior in maintainability, and a wind power generating device employing as a main shaft's bearing thereof the composite sliding bearing.

Solution to Problem

In order to achieve the heretofore described object, a composite sliding bearing of the invention includes an inner ring, formed of split structure ring bodies halved by a center in an axial direction, which has V-section inclined surfaces formed on the outer diameter surfaces of the ring bodies; bearing pads disposed separated on the inclined surfaces of the split rings along the outer diameter surface of the inner ring; and an outer ring on the inner diameter surface of which is formed a V-section umbrella-shaped inclined surface corresponding to the outer diameter surface of the inner ring, wherein the bearing is configured so that a radial load and axial load applied to the bearing are supported by sliding the inner diameter surface of the outer ring on the sliding surfaces of the bearing pads in a condition in which the bearing pads are fluid lubricated.

Also, the composite sliding bearing can be specifically configured in the following aspects.

(1) The bearing pads are configured of tilting pads which enable a tilting movement in at least a direction of rotation of the bearing.

(2) The bearing pads are configured by applying a white metal or a resin overlay low in frictional coefficient to the sliding surfaces of the bearing pads.

(3) Elastic support seats are inserted between the rear surfaces of the bearing pads and the inner diameter inclined surface of the inner ring in order to correct the unevenness in distribution of loads applied to the bearing pads.

(4) Also, as a lubricating mechanism of the composite sliding bearing, an oil supply groove is cut in a central portion of the inner diameter surface of the inner ring, and oil supply holes, communicating with the oil supply groove, which pass through the inner ring in a radial direction are bored in the inner ring, thus supplying lubricating oil from the oil supply groove via the oil supply holes to the sliding surfaces of the bearing pads on which the outer ring slides.

(5) Meanwhile, a wind power generating device of the invention employing as a main shaft's bearing thereof the composite sliding bearing of the heretofore described configuration is such that with the composite sliding bearing as the main shaft's bearing, the inner ring and outer ring of the composite sliding bearing are fixed respectively to a fixed shaft provided on a nacelle side and a rotor center of a generator, thus supporting a rotor of the generator and a wind turbine on the fixed shaft.

(6) Also, in the wind power generating device of the previous article (5), the composite sliding bearing is configured by being assembled in such a way that the nacelle side split ring of the inner ring to which the bearing pads are attached in advance is fitted on the fixed shaft, and positioned and held in a predetermined position, and that the outer ring mounted in a fixed position from the leading edge side of the fixed shaft in this condition is joined to the rotor center, and the other remaining split ring is fitted on the fixed shaft and fixed and supported in a fixed position.

(7) Furthermore, in the previously described configuration, the fixed shaft is a hollow fixed shaft formed into a shape having a space inside, and the oil supply holes communicating with the oil supply groove formed on the inner diameter surface of the inner ring are bored in the peripheral surface of the hollow fixed shaft to which is joined the inner ring of the composite sliding bearing, thus supplying, to the composite sliding bearing, lubricating oil fed from an oil pump through the oil supply holes.

Advantageous Effects of Invention

According to the composite sliding bearing of the invention of the heretofore described configuration, as the bearing pads can be aligned in only two rows compared with the heretofore known assembled structure shown in FIG. 4, the axial length of the composite sliding bearing can be made small and compact to the same extent as that of the double row tapered roller bearing. Also, with regard to the composite sliding bearing, it is possible to improve a bearing function by providing the bearing pads of the composite sliding bearing with a tilting function, in addition, by applying a white metal, or a resin overlay (a sliding layer) of a PEEK resin or Teflon (registered trademark) low in frictional coefficient and superior in sliding characteristics, to the sliding surfaces of the bearing pads, and furthermore, by inserting elastic support seats on the back surface sides of the bearing pads. Also, it is possible to keep the sliding surfaces of the bearing pads in a stable fluid lubricated condition and thus support a radial load and axial load by causing lubricating oil to flow through the lubricating oil supply path of the oil supply groove and oil supply holes formed in the inner ring in accordance with the shape of the sliding bearing.

Furthermore, it is possible to exert a superior effect on the workability of bearing maintenance carried out in a high place of the tower by employing the composite sliding bearing as the main shaft's bearing of the wind power generating device. That is, with the current wind power generating device with the double rolling bearing employed as the main shaft's bearing, it is very difficult to carry out the work of inspecting and replacing the bearing in a high place of the tower, and in particular, with the direct drive type wherein the wind turbine and generator are directly connected by the main shaft, the inspection and replacement work is virtually almost impossible. In this regard, by employing the composite sliding bearing of the invention, it is possible to carry out maintenance work to inspect the bearing and replace and reassemble the bearing pads even in a high place of the tower simply by preparing a jig for maintenance.

DESCRIPTION OF EMBODIMENTS

Hereafter, a description will be given, based on working examples shown in FIGS. 1 to 3, of an embodiment of a composite sliding bearing according to the invention and a wind power generating device equipped with the composite bearing.

Figure 1:
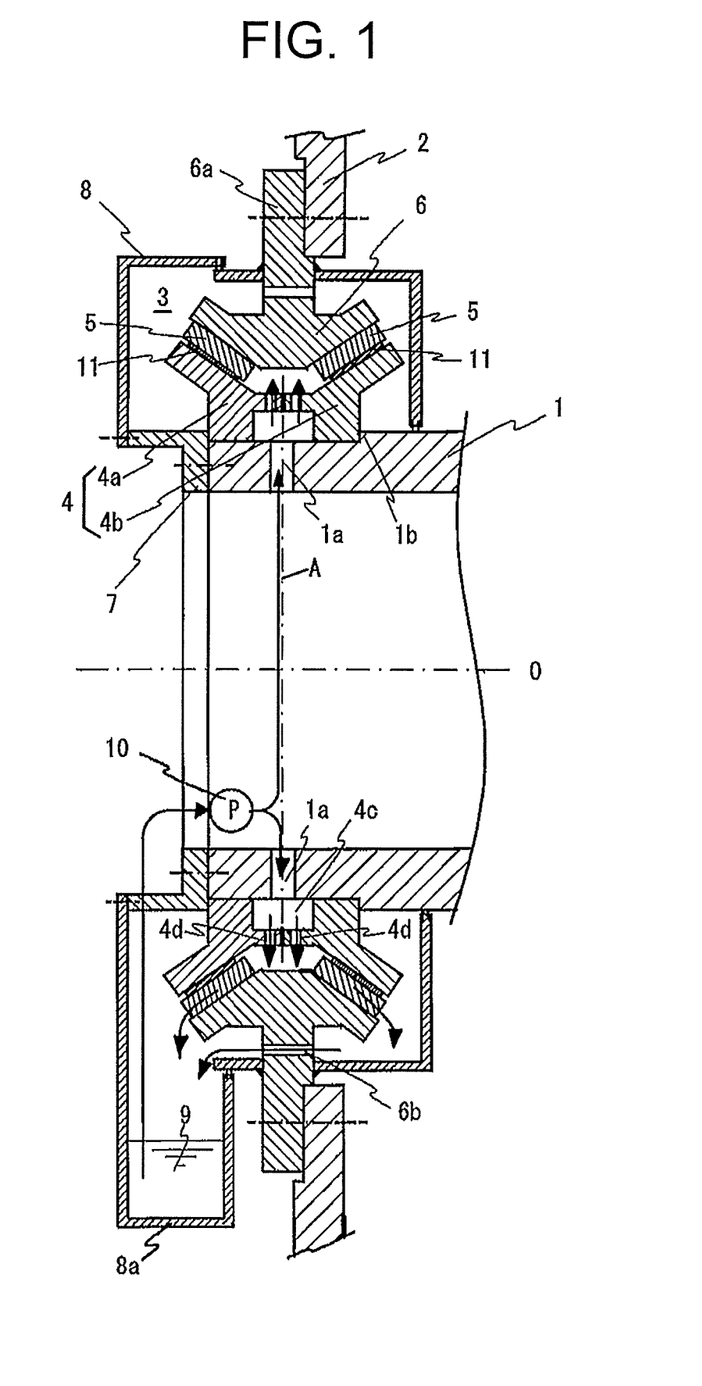
FIG. 1 is a schematic view of an exemplary device.

Firstly, FIG. 1 shows an assembled structure of the composite sliding bearing according to the invention. In FIG. 1, 1 is a cylindrical hollow fixed shaft (horizontal shaft), 2 is a rotor center of a generator, and 3 is a composite sliding bearing supporting the rotor center 2 on the fixed shaft 1. 0 in FIG. 1 is the axial center of the fixed shaft 1.

Herein, the composite sliding bearing 3 is formed of an assembled body of an inner ring 4, formed of split rings 4a and 4b which are halved by an axially central dividing surface A and disposed fitted on the fixed shaft 1, on the outer diameter surface of which V-section inclined surfaces are formed, bearing pads 5 disposed separated on the inclined surfaces of the respective split rings 4a and 4b along the outer diameter surface of the inner ring 4, and an outer ring 6, attached to the rotor center 2 via a flange 6a, on the inner diameter surface of which is formed a V-section, umbrella-shaped inclined surface corresponding to the outer diameter surface of the inner ring 4, and the composite sliding bearing 3 is configured so that the inner diameter surface of the outer ring 6 is slid on the sliding surfaces of the bearing pads 5 in a condition in which the bearing pads 5 are fluid lubricated, thus supporting a radial load and axial load applied to the bearing from the rotor center 2. 7 is a bearing retaining ring which holds the inner ring 4 fitted on the fixed shaft 1 in a fixed position, 8 is a bearing cover enclosing the peripheral region of the composite sliding bearing 3, 8a is an oil reservoir portion in which lubricating oil 9 is collected, and 10 is an oil pump which supplies the lubricating oil 9 from the oil reservoir portion 8a to a lubricating mechanism to be described hereafter.

Also, although no detailed structure is shown in FIG. 1, the bearing pads 5 are fixed on the outer diameter inclined surfaces of the inner ring 4 as tilting pads so as to provide the bearing pads 5 with a tilting function which enables a tilting movement in at least a rotation direction as well as a radial direction as necessary, and a white metal or a resin material, such as a PEEK resin or Teflon (registered trademark), which is low in frictional coefficient and superior in sliding characteristics is layered on the sliding surfaces of the bearing pads 5, thus forming an overlay (a sliding layer) thereon. When applying the composite sliding bearing as a main shaft's bearing with a low speed rotation, as in a direct drive type wind power generating device, a lubricating oil film on the sliding surfaces tends to decrease in thickness, meaning that it is advantageous to use a PEEK resin or Teflon (registered trademark) which is superior in lubricity. Apart from this, it is also possible to obtain the effect of providing the composite sliding bearing with the shaft current prevention function of the generator or the like by using a resin of a high polymer material (an electrical insulating material) for the sliding layer.

Furthermore, in this working example, metal parts having a spring-like effect or elastic support seats 11 made of rubber are inserted between the rear surfaces of the bearing pads 5 and the outer diameter inclined surfaces of the inner ring 4, thereby correcting the unevenness of bearing loads resulting from a deformation of the inner and outer rings 4 and 6 and thus avoiding the bearing loads concentrating on one portion of the bearing pads 5.

Meanwhile, a lubricating oil supply system, to be described next, is configured in order to keep the sliding surfaces of the bearing pads 5 in the fluid lubricated condition in a condition in which the composite sliding bearing 3 is in practical use. That is, an oil supply groove 4c is cut in the inner diameter side center of the inner ring 4 in a circumferential direction, oil supply holes 4d communicating with the oil supply groove 4c and passing through the split rings 4a and 4b in the radial direction are bored in the inner ring 4 so as to be distributed in the circumferential direction, oil passage holes 6b passing through the outer peripheral flange 6a of the outer ring 6 in an axial direction are bored in the flange 6a, and furthermore, one or a plurality of oil supply openings 1a communicating with the oil supply groove 4c are bored in one portion or a plurality of circumferential portions (for example, four portions at 90° intervals) of the peripheral surface of the hollow fixed shaft 1.

With the lubricating oil supply system of the heretofore described configuration, when the lubricating oil 9 fed from the oil reservoir portion 8a via the oil pump 10 is supplied from the inner diameter side of the hollow fixed shaft 1 via a discharge tube of the oil pump 10 to the oil supply groove 4c of the inner ring 4 through the oil supply opening 1a, the lubricating oil 9, as indicated by the arrows shown in FIG. 1, flows through the oil supply holes 4d to the sliding surfaces of the bearing pads 5 fixed on the inclined surfaces of the split rings 4a and 4b, and after lubricating and cooling the two rows of bearing pads 5, the lubricating oil 9 flows back to the oil reservoir portion 8a, and is sucked up therefrom again by the oil pump 10 and thus cyclically supplied to the bearing.

Figure 2A:
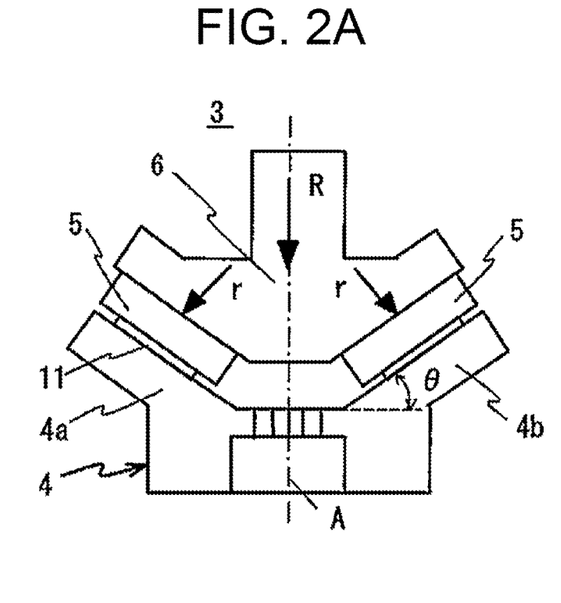
FIG. 2A is another schematic view of an exemplary device.
Figure 2B:
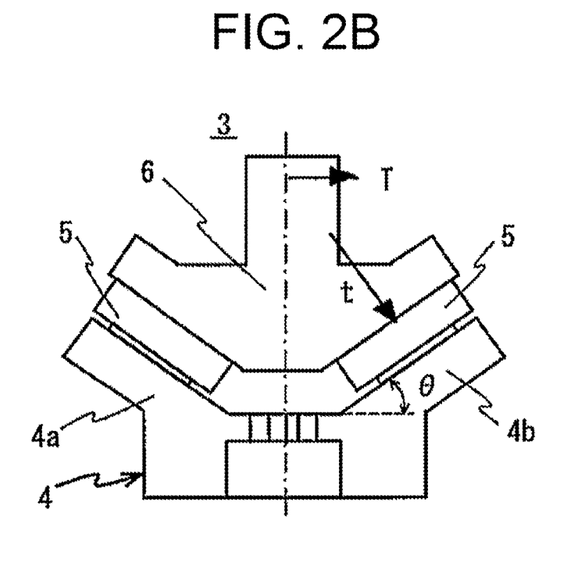
FIG. 2B is another schematic view of an exemplary device.
Figure 2C:
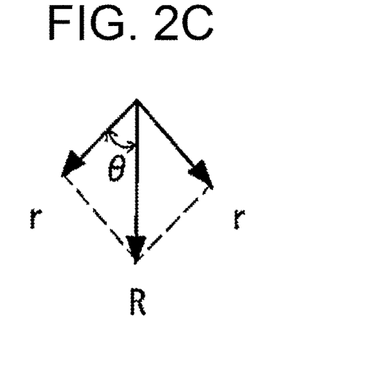
FIG. 2C shows an angle corresponding to the device of FIG. 2A.
Figure 2D:
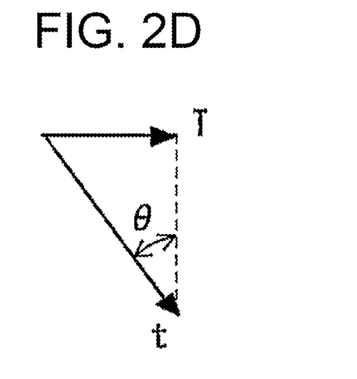
FIG. 2D shows an angle corresponding to the device of FIG. 2B.

Next, a description will be given, using (a) and (b) of FIG. 2, of an operation and function of the composite sliding bearing of the heretofore described configuration. When a radial load R and an axial load T are applied to the composite sliding bearing 3 in a condition in which a rotor of the generator and a wind turbine are pivoted on the fixed shaft 1 (horizontal shaft) via the composite sliding bearing 3, as previously described in FIG. 1, the radial load R is supported by force components r thereof acting on the two rows of bearing pads 5 disposed on the V-shaped inclined surfaces of the inner ring 4 (refer to (a) of FIG. 2), and the axial load T is supported by a force component t acting on the bearing pad 5 corresponding to the direction of the load (refer to (b) of FIG. 2).

Herein, an inclination angle (contact angle) θ of the inclined surfaces of the inner ring 4, shown in FIG. 2, is selected so that the resultant force (total gross load) of the component forces r of the radial load, and the component force t of the axial load, which act on the bearing pads 5 are minimum. Also, the contact angle of the outer ring 6 is set to be basically the same as the angle θ of the inner ring 4, but may be changed to some extent taking into account the amount of deformation of the inner ring 4.

In the composite sliding bearing 3 of the heretofore described working example, the main shaft's bearing is configured using the inner ring 4 as a fixed ring mounted on the fixed shaft 1 and the outer ring 6 as a rotating ring, but the inner ring 4 and outer ring 6 can also be used in accordance with the form of the main shaft in such a way that the main shaft is pivoted with the inner ring 4 as a rotating ring and the outer ring 6 as a fixed ring. Also, the split rings 4a and 4b of the inner ring 4 are stacked in the axial direction in the structure shown in the drawings, but a spacer may be installed between the split rings 4a and 4b as necessary.

Figure 3:
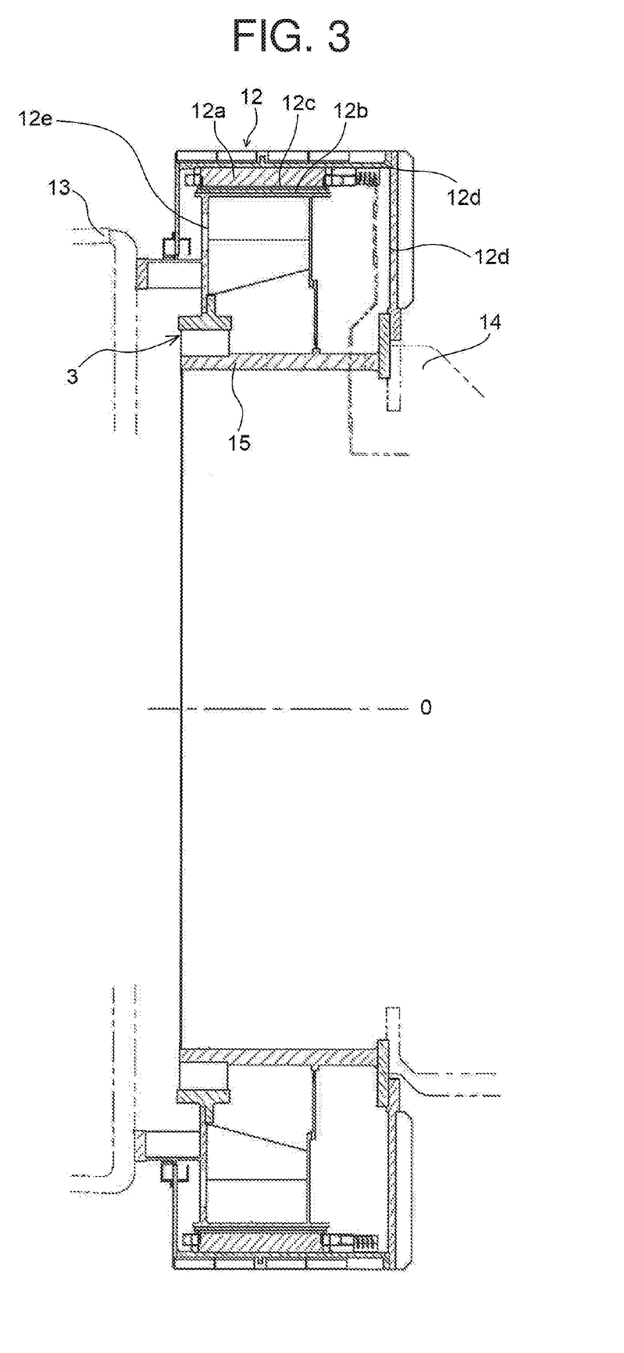
FIG. 3 is another schematic view of an exemplary device.

Next, FIG. 3 shows a working example of a direct drive type wind power generating device wherein the previously described composite sliding bearing is employed as the main shaft's bearing of the generator. In FIG. 3, 12 is a generator (a permanent magnet type synchronous generator), 13 is a rotor hub of a wind turbine connected directly to the front of the rotor of the generator 12, and 14 is a nacelle mounted on a top portion of a tower via a yaw drive device (not shown), wherein the rotor of the generator and the wind turbine are rotatably supported on a fixed shaft 15 (corresponding to the cylindrical hollow fixed shaft 1 in FIG. 1) provided on a front portion of the nacelle 14 via the composite sliding bearing 3 of the invention described in FIG. 1.

Herein, 12a is a stator core of the generator 12, 12b is a rotor core, 12c are rotor magnetic poles (permanent magnets aligned on the periphery of the rotor core), 12d is a generator frame of the generator 12, and 12e is a rotor center (corresponding to the rotor center 2 in FIG. 1) supporting the rotor core 12b, wherein the generator frame 12d of the generator 12 is fixed to a front portion of the nacelle 14, and the rotor hub 13 of the windmill is linked to the front of the rotor center 12e, thus supporting a vane wheel in an overhanging condition. Further, the composite sliding bearing 3, being installed between the fixed shaft 15 and the rotor center 12e of the generator 12, pivots the wind turbine and the rotor of the generator so that the wind turbine and rotor are rotatable.

The wind power generating device of FIG. 3 is designed so that the ratio of the length to the diameter of the generator stays on the order of 20% with the intention to achieve an increase in diameter and a decrease in axial length in order to increase the circumferential speed of the generator 12, and the rotor of the generator and the wind turbine are pivoted on the fixed shaft 15 by one composite sliding bearing 3, thus supporting the radial load and axial load (a wind load on the wind turbine) applied when in operation.

With the heretofore described configuration, a rotor assembled body of the generator 12 is temporarily fixed inside the stator core 12a using an unshown jig, in advance, in order to install and mount the composite sliding bearing 3 between the fixed shaft 15 and the rotor center 12e of the generator 12. Also, the bearing pads 5 are attached in advance to the inner ring 4 of the composite sliding bearing 3 (refer to FIG. 1 for the detailed structure). In this condition, firstly, the nacelle side split ring 4b of the inner ring is fitted on the shaft peripheral surface from the leading edge side of the fixed shaft 15, and the split ring 4b is pressed against a shoulder portion 1b (refer to FIG. 1) of the shaft peripheral surface and thus positioned in a predetermined position. Next, after the outer ring 6 is mounted on the inner peripheral side of the split ring 4b and superimposed on the sliding surface of the bearing pad 5, the outer peripheral flange 6a of the outer ring 6 is linked to the rotor center 12e of the generator 12. Subsequently, after the other split ring 4a of the inner ring 4 is fitted on the peripheral surface of the fixed shaft 15, and the bearing pad 5 of the split ring 4a is superimposed on the umbrella-shaped inclined surface of the outer ring 6, finally, the bearing retaining ring 7 is pressed against the edge surface of the split ring 4a, thus fixing the bearing in a fixed position. Next, the jig used to temporarily fix the rotor of the generator 12 is dismounted, thus completing the work of mounting the composite sliding bearing 3 and the rotor of the generator 12, and after that, the rotor hub 13 of the wind turbine is linked to the front portion of the rotor center 12e.

Meanwhile, as disassembly and dismount of the composite sliding bearing 3 can be carried out according to a procedure the reverse of the previously described assembly procedure, there is a contribution to the maintainability of the bearing too. That is, with a current wind power generating device having a rolling bearing used as the main shaft's bearing thereof, it is very difficult to replace a bearing part in a high place of the tower, and in particular, with the direct drive type wind power generating device, the replacement is virtually almost impossible.

In this regard, with the wind power generating device employing the composite sliding bearing of the previously described configuration, it is possible to carry out disassembly of the composite sliding bearing and replacement of parts on the tower by preparing hoisting and extracting jigs for maintenance. That is, in order to replace, for example, the bearing pad 5 mounted on the Wind turbine side split ring 4a of the composite sliding bearing 3 (refer to FIG. 1) in a condition in which the wind power generating device is mounted, as shown in FIG. 3, the rotor assembled body of the generator 12 is temporarily fixed to the stator core 12a, in the same way as in the previously described assembly, using a jig prepared in advance. In this condition, next, the bearing retaining ring 7 is dismounted, and next, the split ring 4a is extracted from the fixed shaft 15 using the hoisting and extracting jigs, moved to a position in which the work of replacing the bearing bad 5 is possible, and replaced with a new bearing pad.

By so doing, it is possible, even when maintaining the wind power generating device or even when it is necessary to replace a bearing part, to carry out an internal inspection of the bearing and the work of replacing the bearing pad, without any difficulty, according to the previously described working procedure.

The invention claimed is:

1. A composite sliding bearing, comprising:
    an inner ring including ring bodies halved by an axially central dividing surface;
    bearing pads disposed on inclined surfaces of the ring bodies; and
    an outer ring disposed on the bearing pads and having an inner diameter surface corresponding to an outer diameter surface of the inner ring;
    wherein a radial load and an axial load applied to the bearing pads are supported by sliding the inner diameter surface of the outer ring on sliding surfaces of the bearing pads when the bearing pads are fluid-lubricated; and
    wherein an oil supply groove is cut in a central portion of an inner diameter surface of the inner ring, and oil supply holes, communicating with the oil supply groove, which pass through the inner ring in a radial direction, are bored in the inner ring, lubricating oil being supplied from the oil supply groove via the oil supply holes to the sliding surfaces of the bearing pads on which the outer ring slides.

2. The composite sliding bearing according to claim 1, wherein the bearing pads are tilting pads that enable a tilting movement in at least a direction of rotation of the bearing.

3. The composite sliding bearing according to claim 1, wherein a white metal or a resin overlay is applied to the sliding surfaces of the bearing pads.

4. The composite sliding bearing according to claim 1, wherein elastic support seats are inserted between rear surfaces of the bearing pads and the inclined surfaces of the ring bodies.

5. A wind power generating device, wherein a composite sliding bearing according to claim 1 is a bearing of a main shaft, the inner ring of the composite sliding bearing being fixed to a fixed shaft provided on a nacelle side and the outer ring of the composite sliding bearing being fixed to a rotor center of a generator, thus supporting a rotor of the generator and a wind turbine on the fixed shaft.

6. The wind power generating device according to claim 5, wherein:
   the composite sliding bearing is such that a nacelle-side ring body of the inner ring bodies to which the bearing pads are attached is fitted on the fixed shaft and positioned and held in a predetermined position; and
   the outer ring is mounted in a fixed position from a leading-edge side of the fixed shaft and joined to the rotor center, and another ring body of the inner ring bodies is fitted on the fixed shaft and fixed and supported in a fixed position.

7. The wind power generating device according to claim 5, wherein:
   the fixed shaft is a hollow fixed shaft formed into a shape having a space inside; and
   oil supply holes communicating with the oil supply groove of the inner diameter surface of the inner ring are bored in a peripheral surface of the hollow fixed shaft to which is joined the inner ring of the composite sliding bearing, thus supplying, to the composite sliding bearing, lubricating oil fed from an oil pump through the oil supply holes of the peripheral surface of the hollow fixed shaft.

* * * * *